W. T. LILLY.
PLOW.
APPLICATION FILED AUG. 11, 1919.

1,330,812.

Patented Feb. 17, 1920.

Inventor
William T. Lilly,
By A. L. Hough
Attorney

UNITED STATES PATENT OFFICE.

WILLIAM T. LILLY, OF BECKLEY, WEST VIRGINIA, ASSIGNOR OF ONE-HALF TO JAHUA A. LILLY, OF GLEN MORGAN, WEST VIRGINIA.

PLOW.

1,330,812.                    Specification of Letters Patent.       Patented Feb. 17, 1920.

Application filed August 11, 1919. Serial No. 316,674.

*To all whom it may concern:*

Be it known that I, WILLIAM T. LILLY, a citizen of the United States, residing at Beckley, in the county of Raleigh and State of West Virginia, have invented certain new and useful Improvements in Plows, of which the following is a specification, reference being had therein to the accompanying drawing.

This invention relates to new and useful improvements in plow points and consists essentially in the provision of a point having an elongated integral cutting blade or ridge adapted to extend a considerable distance above the surface of the ground being plowed, and adapted to prevent roots catching over the cutter, the plow being reinforced by integral ribs disposed at inclinations to each other.

My invention comprises various other details of construction, combination and arrangement of parts which will be hereinafter fully described, shown in the accompanying drawings and then specifically defined in the appended claims.

I illustrate my invention in the accompanying drawings which, with the letters of reference marked thereon, form a part of this application and in which.

Figure 1:
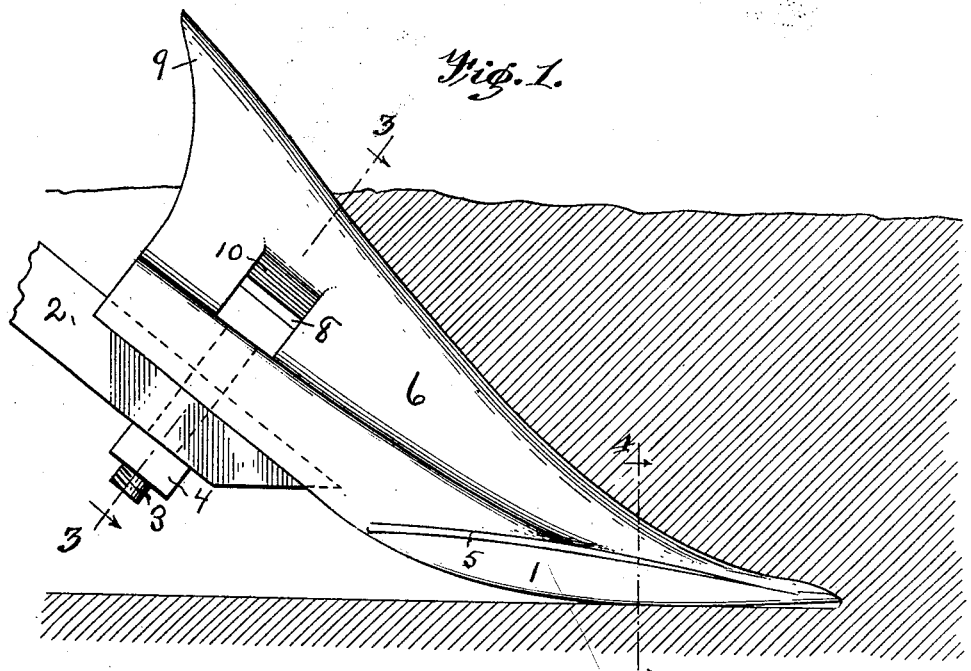
Figure 1 is a side elevation of the point.
Figure 2:
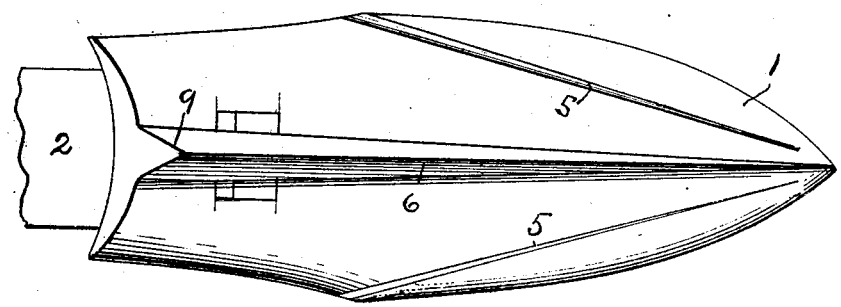
Fig. 2 is a top plan view.
Figure 3:
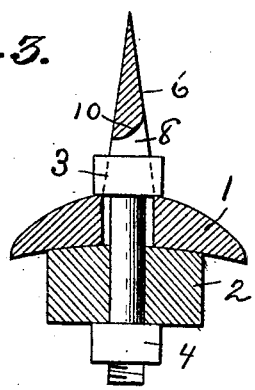
Fig. 3 is a sectional view on line 3—3 of Fig. 1.
Figure 4:
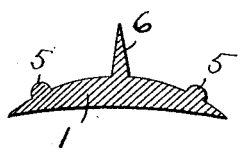
Fig. 4 is a view on line 4—4 of Fig. 1.

Reference now being had to the details of the drawings by numerals:

1 designates a plow point, the under surface of which is concaved, and is provided with a tapering ridge 6, disposed at an inclination and centrally of the point, the lower portion of the ridge being concaved, and extending to the tip of the point. The upper portion of the ridge widens and terminates in a contracted concaved hook 9. The point is shown as having an opening 8 with a convexed wall 10 therein, as shown clearly in Fig. 3 of the drawings, and a bolt 3 is adapted to be passed through said opening which extends through the bottom of the point, the bolt also passing through a beam 2. A nut 4 is mounted upon the threaded end of the bolt and is adapted to draw the head of the bolt tightly against the plow at points opposite each other, as shown in Fig. 3 of the drawings.

Ribs 5 are formed integral with the plow one upon either side of the central cutting ridge, and are disposed at inclinations to each other, and serve to reinforce the plow and hold the same rigidly to its work.

By the provision of a point made in accordance with my invention, it will be noted that the ridge will tend to sever roots and cut the soil, the ridge being of such a shape as to prevent the roots catching over the top while plowing.

What I claim to be new is:

1. A plow point the upper surface of which is convexed and its under surface concaved with a central flaring ridge extending the length of the point upon its convexed surface, and inclined with its lower portion concaved, the upper end of said ridge being concaved forming a contracted hook, said ridge having an opening therein adapted to receive fastening means for attaching same to a beam.

2. A plow point the upper surface of which is convexed and its under surface concaved with a central flaring ridge extending the entire length of the point upon its upper surface and inclined with its lower portion concaved, said convexed surface of the point having diagonally disposed ribs disposed at an angle to said ridge and their forward ends terminating a short distance from the forward end of the point.

3. A plow point the upper surface of which is convexed and its under surface concaved, the upper surface of the point having a central longitudinal inclined ridge the lower portion of which is concaved, the upper end of said ridge being concaved forming a contracted hook, the upper surface of the point having oppositely disposed ribs at angles to each other, said ridge having an opening the upper marginal edge of which is convexed and adapted to receive a fastening means for attaching the point to a beam.

In testimony whereof I hereunto affix my signature.

WILLIAM T. LILLY.